(12) United States Patent
Tsujita

(10) Patent No.: US 8,339,579 B2
(45) Date of Patent: Dec. 25, 2012

(54) EXPOSURE METHOD

(75) Inventor: Kouichirou Tsujita, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 272 days.

(21) Appl. No.: 11/457,233

(22) Filed: Jul. 13, 2006

(65) Prior Publication Data

US 2007/0013896 A1   Jan. 18, 2007

(30) Foreign Application Priority Data

Jul. 15, 2005   (JP) ................... 2005-207527

(51) Int. Cl.
*G03B 27/32* (2006.01)
*G03B 27/54* (2006.01)

(52) U.S. Cl. .................... 355/77; 355/67

(58) Field of Classification Search .......... 355/53, 355/77, 52, 67
See application file for complete search history.

(56) References Cited

U.S. PATENT DOCUMENTS

| | | | |
|---|---|---|---|
| 5,465,220 A | 11/1995 | Haruki et al. | |
| 5,680,588 A | 10/1997 | Gortych et al. | |
| 5,723,233 A * | 3/1998 | Garza et al. | 430/5 |
| 6,121,086 A * | 9/2000 | Kuroda et al. | 438/256 |
| 6,128,067 A * | 10/2000 | Hashimoto | 355/52 |
| 6,453,452 B1 * | 9/2002 | Chang et al. | 716/8 |
| 6,738,859 B2 | 5/2004 | Liebchen | |
| 6,961,115 B2 | 11/2005 | Hamatani et al. | |
| 7,029,799 B2 | 4/2006 | Kyoh et al. | |
| 2002/0177048 A1 * | 11/2002 | Saitoh et al. | 430/5 |
| 2003/0142286 A1 | 7/2003 | Adachi et al. | |
| 2004/0174507 A1 | 9/2004 | Oishi | |
| 2004/0202963 A1 | 10/2004 | Chang | |
| 2005/0028129 A1 | 2/2005 | Hsu et al. | |
| 2005/0076320 A1 | 4/2005 | Maeda | |
| 2005/0188341 A1 * | 8/2005 | Fukuhara et al. | 716/19 |
| 2006/0068301 A1 | 3/2006 | Hirukawa | |

FOREIGN PATENT DOCUMENTS

| | | |
|---|---|---|
| JP | 6-120119 | 4/1994 |
| JP | 8-335552 | 12/1996 |
| JP | 2002-184688 | 6/2002 |
| JP | 2002-319539 | 10/2002 |
| JP | 2002-324752 | 11/2002 |
| JP | 2005-26701 | 1/2005 |

(Continued)

OTHER PUBLICATIONS

D. Flagello et al., "Optical Lithography in the sub-50nm regime", Proc. SPIE, vol. 5377, (2003) pp. 21-33.

(Continued)

*Primary Examiner* — Toan Ton
*Assistant Examiner* — Steven H Whitesell Gordon
(74) *Attorney, Agent, or Firm* — Rossi, Kimms & McDowell LLP

(57) ABSTRACT

An exposure method for exposing a pattern of a reticle which includes a first pattern and a second pattern by using a light from a light source and an optical system includes the steps of obtaining information relating to the first pattern and plural types of representative patterns that can be used for the second pattern, and setting, for the first pattern and the plural types of representative patterns, (i) at least one exposure parameter of the light source and the optical system or (ii) a size or shape of the first pattern and the plural types of representative patterns.

15 Claims, 11 Drawing Sheets

FOREIGN PATENT DOCUMENTS

| | | |
|---|---|---|
| TW | 583504 | 4/2004 |
| TW | 1234195 | 6/2005 |

OTHER PUBLICATIONS

Chinese Office Action issued on the counterpart Chinese application No. 200610106374.7, dated Jun. 29, 2008.

English translation of the Chinese Office Action issued on the counterpart Chinese application No. 200610106374.7, dated Jun. 29, 2008.

Taiwanese Office Action issued on Jan. 22, 2009 for the Taiwanese Patent Application No. 095125941 (English translation provided).

\* cited by examiner

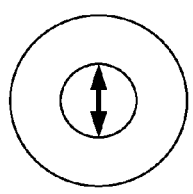 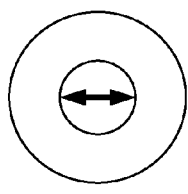 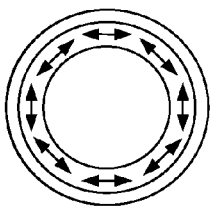 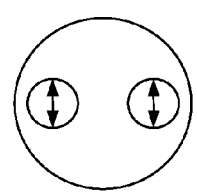
FIG. 8A    FIG. 8B    FIG. 8C    FIG. 8D
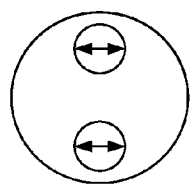 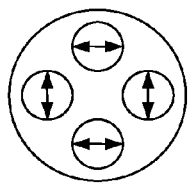 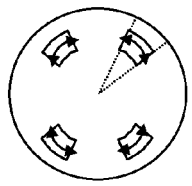 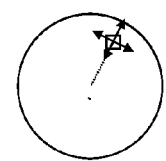
FIG. 8E    FIG. 8F    FIG. 8G    FIG. 8H

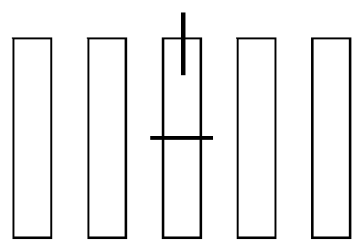 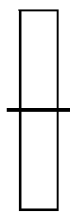 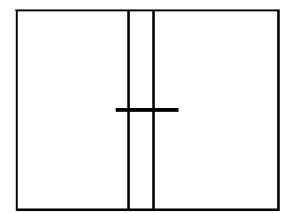
FIG. 9A        FIG. 9B        FIG. 9C
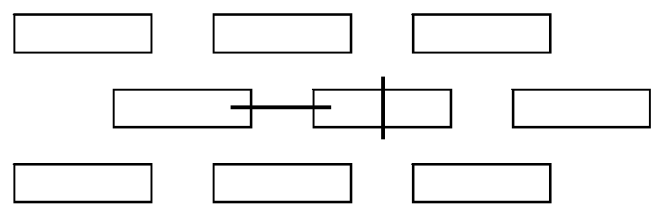
FIG. 9D

EXPOSURE METHOD

BACKGROUND OF THE INVENTION

The present invention relates generally to an exposure method, and more particularly to an optimization of an exposure condition of the exposure apparatus and an optimization of a reticle or mask pattern. The present invention is suitable, for example, for the optimizations of the exposure condition and reticle pattern to expose a pattern of a semiconductor memory.

A conventional projection exposure apparatus uses a projection optical system to expose a reticle pattern onto a wafer etc., and an exposure apparatus that provides exposure at a high resolution has been increasingly demanded. An optimization of the exposure condition and reticle pattern is important to increase the resolution. A reticle pattern is optimized, for example, by an optical proximity correction ("OPC"). For an effective optimization, use of a simulation or simulator is known. See, for example, Japanese Patent Applications, Publication Nos. 2002-319539, 2002-324752, 06-120119, 08-335552 and 2002-184688.

A semiconductor memory, such as a DRAM and an SRAM, includes a memory cell as a storage region in a RAM and its peripheral circuit. In general, the optimization of the exposure condition and the reticle pattern requires information on part of the pattern to be optimized and a target value of the part (such as a margin and a size) as well as information of the whole pattern. Thus, mere pattern information of a real device or chip would be insufficient for the optimization. Often, a lithography engineer does not know information on the peripheral circuit pattern, and hardly acquires the information of the entire pattern of the entire real device. In addition, numerous parts need to be optimized on the pattern of the whole real device, and the optimizations of all of these parts are time-consuming and impracticable. Thus, prior art optimizes the exposure condition and reticle pattern only for the memory cell pattern, not the entire real device, in exposing a semiconductor memory pattern. See, for example, Japanese Patent Application, Publication No. 2005-26701, D. Flagello et al., "Optical Lithography in the sub-50 nm Regime," Proc. SPIE, vol. 5377 (2003).

However, the exposure condition and reticle pattern optimized only for the memory cell are likely to cause patterning failures for the peripheral circuit, and do not always improve the resolution of the whole chip on average.

BRIEF SUMMARY OF THE INVENTION

The present invention is directed to an exposure apparatus having a high resolution.

An exposure method according to one aspect of the present invention for exposing a pattern of a reticle which includes a first pattern and a second pattern by using a light from a light source and an optical system includes the steps of obtaining information relating to the first pattern and plural types of representative patterns that can be used for the second pattern, and setting, for the first pattern and the plural types of representative patterns, (i) at least one exposure parameter of the light source and the optical system or (ii) a size or shape of the first pattern and the plural types of representative patterns.

Other objects and further features of the present invention will become readily apparent from the following description of the preferred embodiments with reference to the accompanying drawings.

BRIEF DESCRIPTION OF THE DRAWINGS

FIGS. 8A to 8H are plane views of effective light source shapes and their polarization states.

FIGS. 9A to 9D are plane views of some patterns and corresponding evaluation points.

DETAILED DESCRIPTION OF THE PREFERRED EMBODIMENTS

Referring now to the accompanying drawings, a description will be given of the preferred embodiment of the present invention.

First Embodiment

Figure 7A:
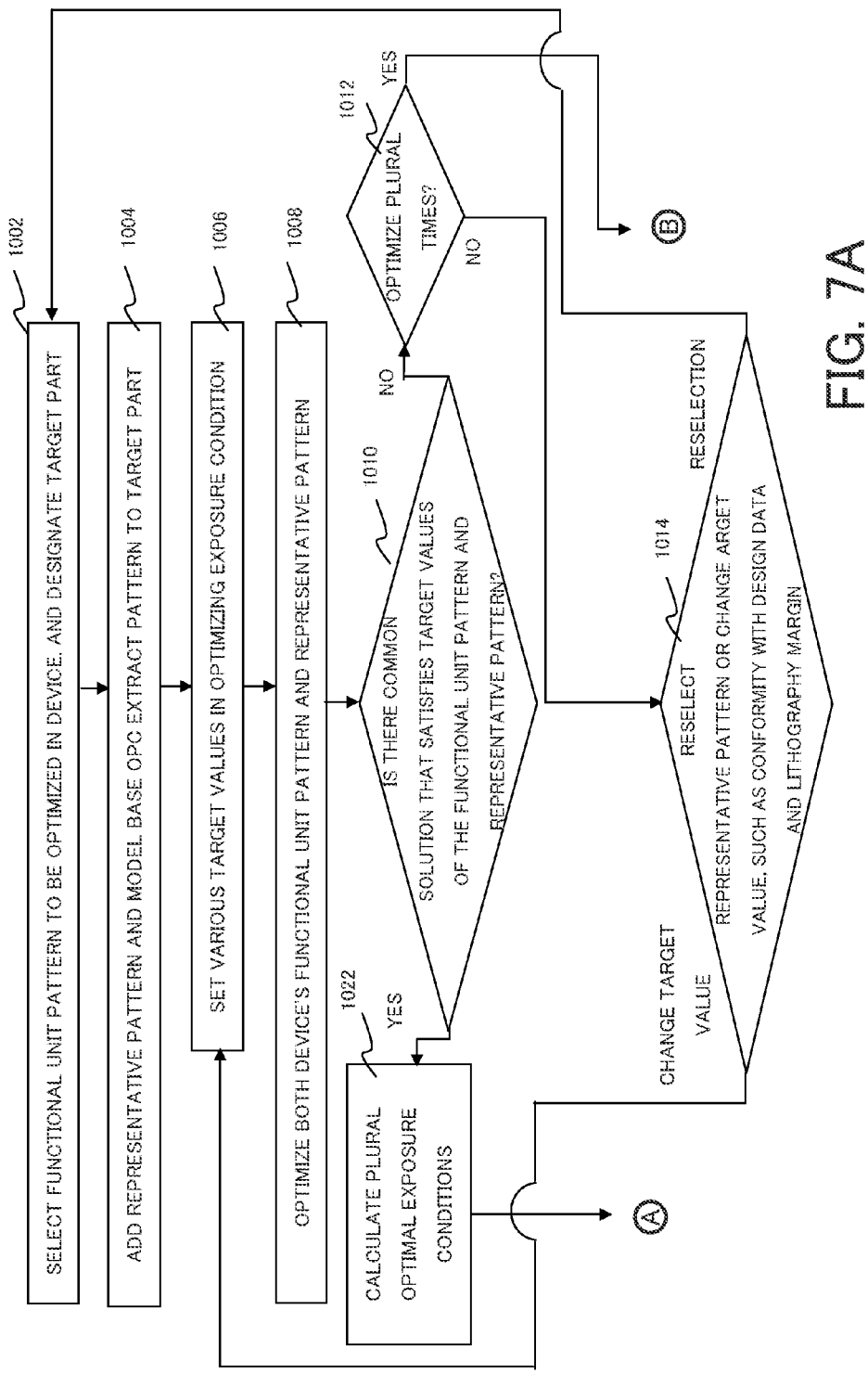
FIGS. 7A-7C are a flowchart for explaining an optimization algorithm according to a first embodiment of the present invention.
Figure 7B:
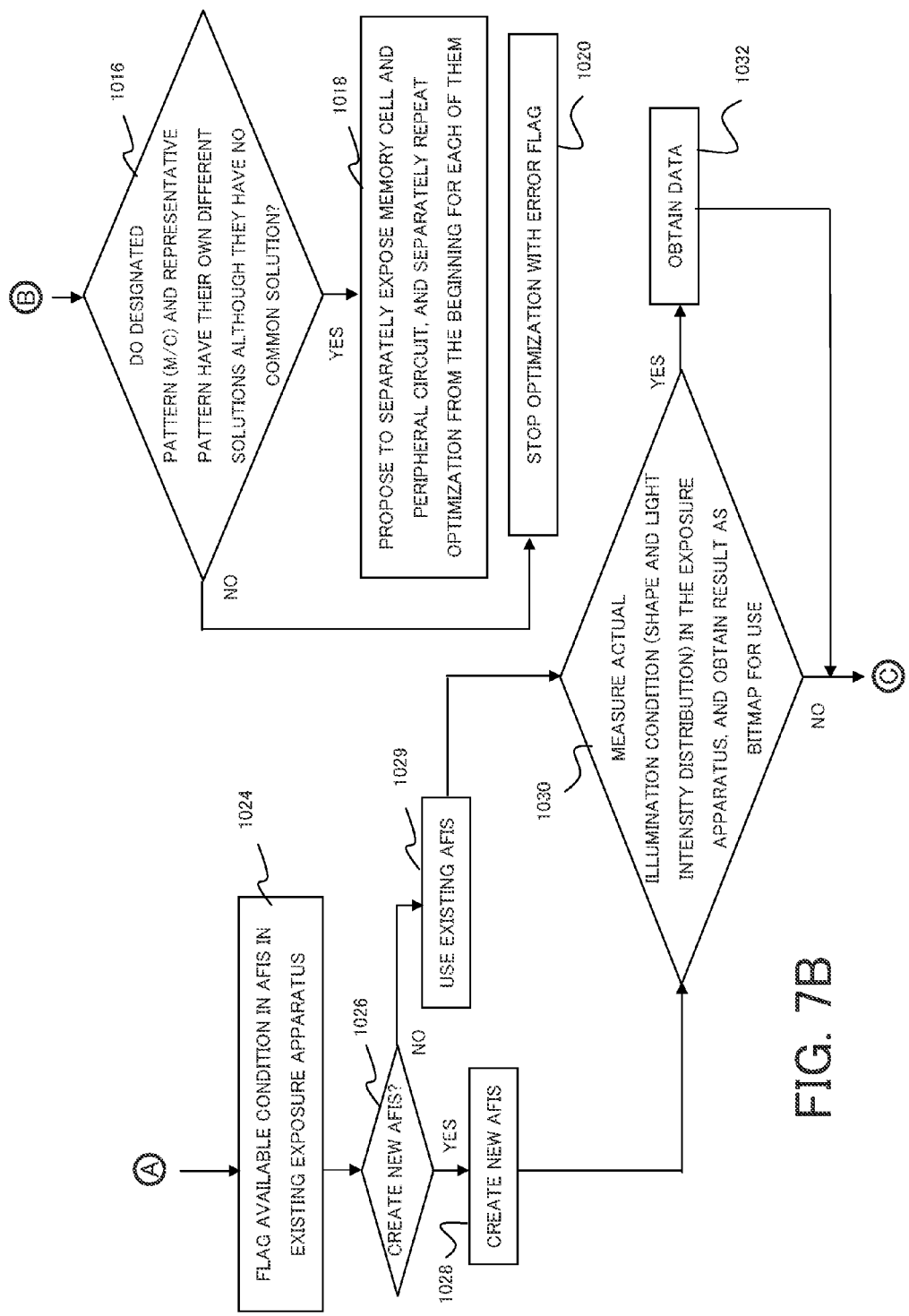
Figure 7C:
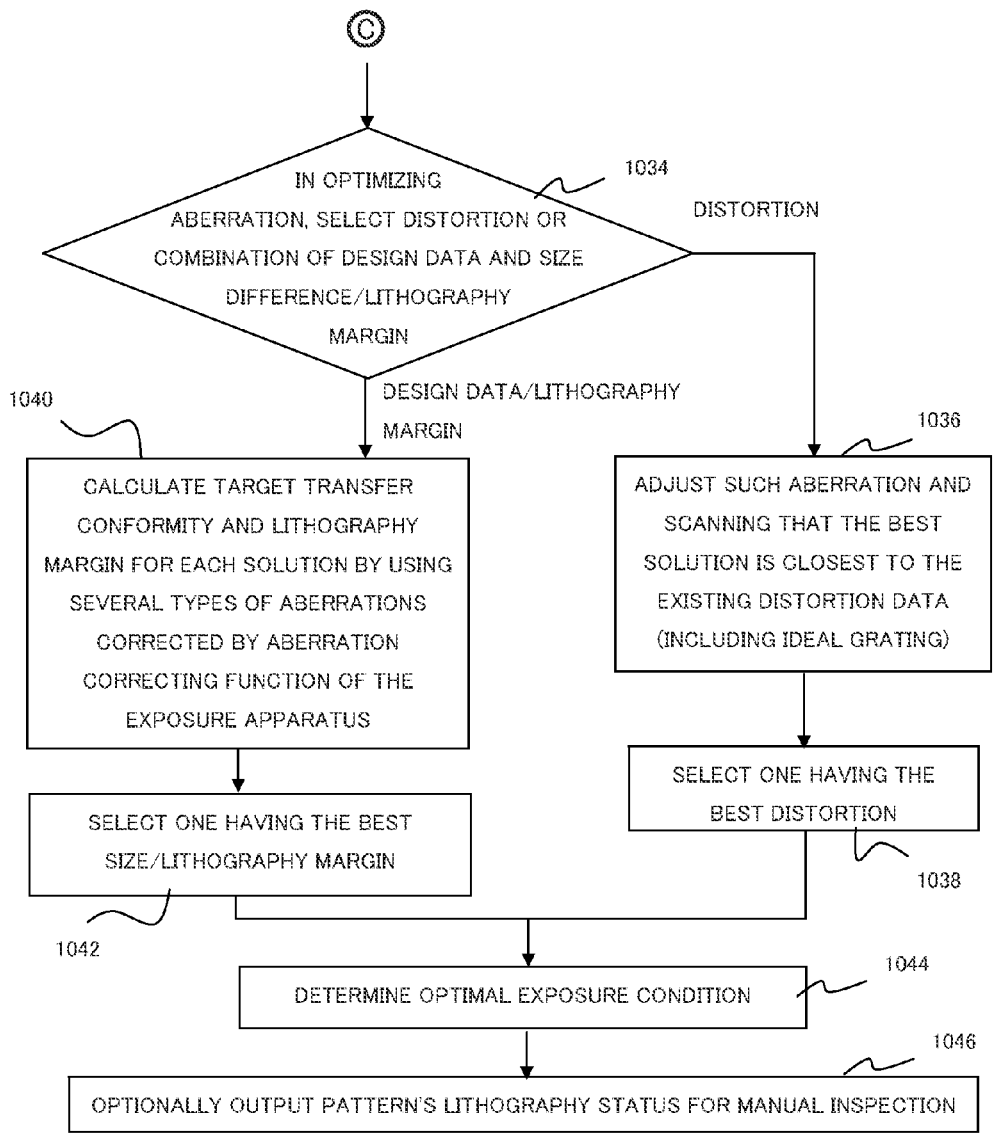

Referring now to FIGS. 7A-7C, a description will be given of the optimization of the exposure condition and reticle pattern according to a first embodiment of the present invention. Here, FIGS. 7A-C is a flowchart of an optimization algorithm of this embodiment. This algorithm is implemented, for example, as a program executed by a computer.

As described above, the optimization needs the information on the pattern, part to be optimized in the pattern ("target part"), and a target value of the optimization.

To begin with, a functional unit pattern to be optimized in a device and the target part are designated (step 1002). Next, a representative pattern (a basic pattern and a risky pattern) and a model base OPC extract pattern are added to the target part (step 1004).

Thus, this embodiment uses, as pattern information, information on the device's functional unit pattern and the representative pattern among the reticle pattern. Here, the reticle pattern includes the device's functional unit pattern and the peripheral circuit pattern.

Figure 1A:
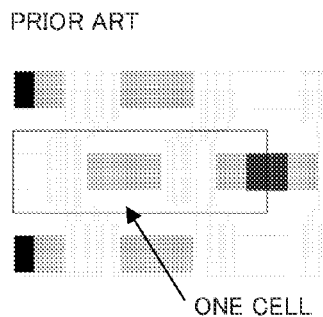
FIG. 1A is a plane view of a typical pattern of one cell in a memory cell in a DRAM.
Figure 1B:
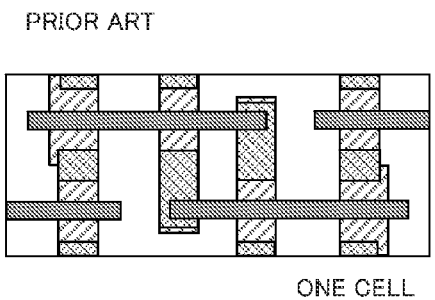
FIG. 1B is a plane view of a typical pattern of one cell in a memory cell in an SRAM.
Figure 2:
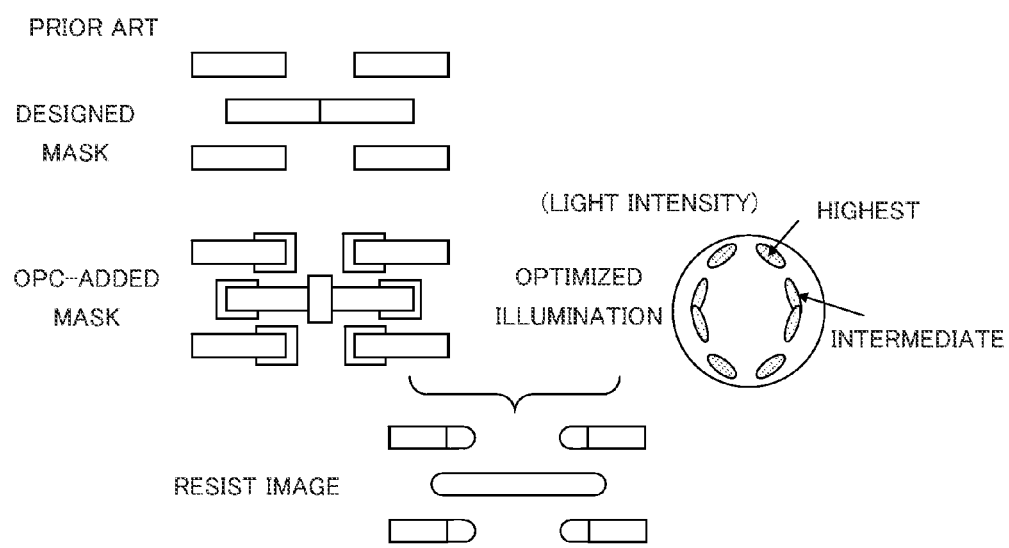
FIG. 2 is a schematic view of a conventional optimization dedicated only to the memory cell.

The functional unit pattern includes a memory cell pattern, a standard cell pattern, a macro cell pattern, etc. This embodiment assumes that the functional unit pattern is always available and a principal object of the optimization. In general, as shown in FIG. 1, such memories as a DRAM and an SRAM have memory cells that have different layout in the longitudinal and lateral directions for fine processing. Here, FIGS. 1A and 1B are schematic views of typical patterns of memory cells in a DRAM and an SRAM. In optimizing the exposure condition and the reticle pattern only for the memory cell, the designed memory cell pattern is OPC-processed as shown in FIG. 2. The pattern is illuminated with an effective light source shape that is asymmetric in the XY directions. Here, FIG. 2 is a schematic view of the conventional optimization dedicated only to the memory cell. This optimization provides the resist image as shown in FIG. 2.

The peripheral circuit pattern is arranged around the memory cell. The peripheral circuit pattern has a layout different from that of the memory cell. For example, in the peripheral circuit pattern, the longitudinal and lateral patterns can be the same, and it can have an isolated pattern. Often, lithography engineers do not know the peripheral circuit pattern.

This embodiment allows the peripheral circuit pattern to be represented by a representative pattern that is likely to be used for the peripheral circuit pattern. The representative pattern serves as the model base OPC extract pattern, and includes both a basic pattern that is fundamental to the peripheral circuit pattern, and a risky pattern that is highly difficult to resolve. The basic and risky patterns are preinstalled in this optimization system. Fundamental shapes shown in FIGS. 3 and 4 are predetermined for the basic and risky patterns, and detailed parameters of a figure to be used are set based on matching with the size of the device pattern.

The peripheral circuit pattern is characteristic in some devices, and the basic pattern needs designations of the pattern and the size used for the optimization. FIGS. 3A-4B show a basic pattern group. These are usable as a model base OPC extract pattern. FIG. 3A-4B are normalized by a wavelength $\lambda$ of a light source of 193 nm, and an NA of 0.85.

Figure 3A:
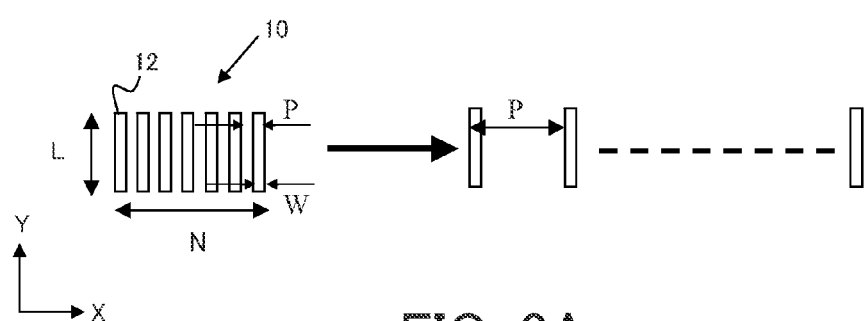
FIGS. 3A to 3C are plane views of a basic pattern group used for one embodiment of the present invention.
Figure 3B:
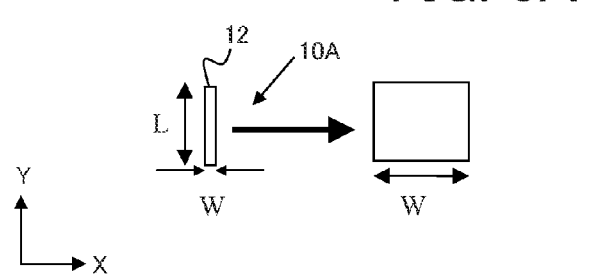
Figure 3C:
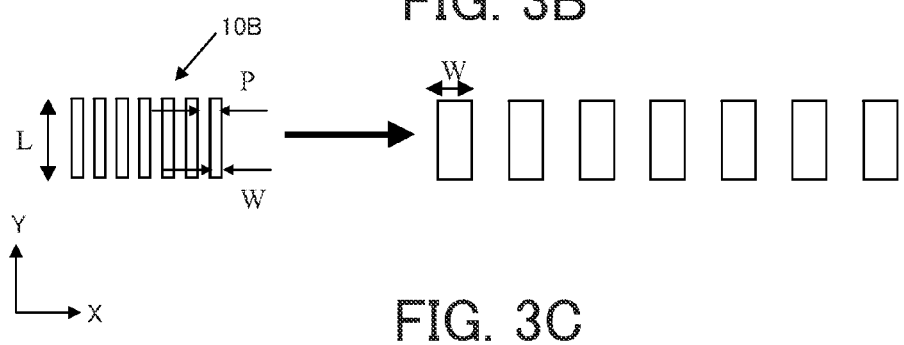

FIGS. 3A to 3C show three types of basic patterns 9 to 9B that extend in the Y direction and measure a wire width.

FIG. 3A is a plane view of the basic pattern 10 as a line and space ("L&S") pattern. Each line pattern 12 has a length L ($>2 \cdot (\lambda/NA)=454$ nm) and a width W, and the L&S pattern defines a pitch P and the number N. The basic pattern 10 has fixed L, W and N and a variable P.

FIG. 3B is a plane view of the basic pattern 10A that includes an isolated pattern 12 having a fixed length L and a variable width W.

FIG. 3C is a plane view of the basic pattern 10B as an L&S pattern similar to that in FIG. 3A. Each line pattern 12 has a length L ($>2 \cdot (\lambda/NA)=454$ nm) and a width W. The L&S pattern defines a pitch P and the number N. The basic pattern 10B fixes the L and duty (=W/(P−W)) to 1 and has a variable W.

Figure 4A:
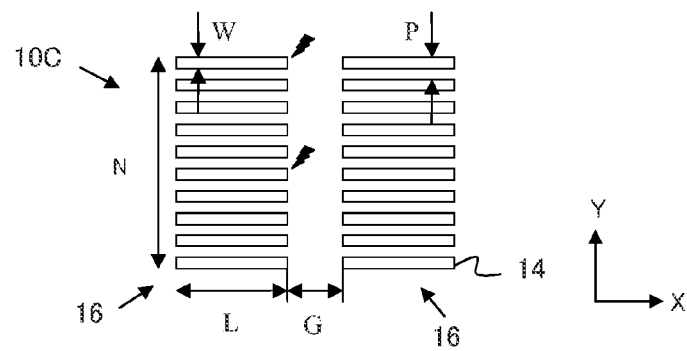
FIGS. 4A to 4C are plane views of a basic pattern group used for one embodiment of the present invention.
Figure 4B:
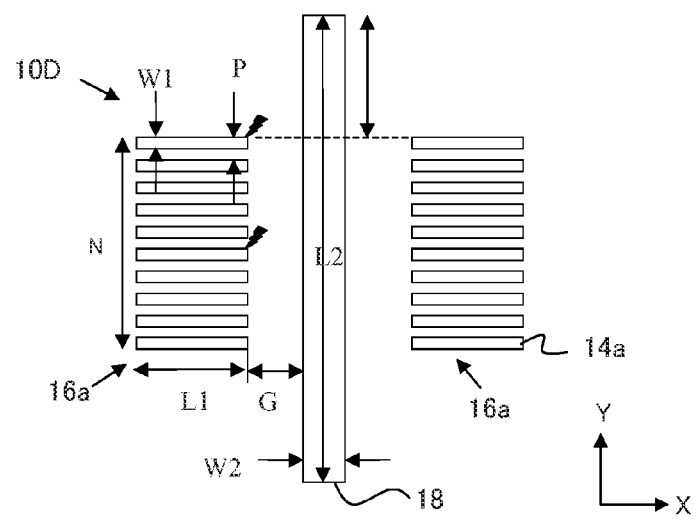
Figure 4C:
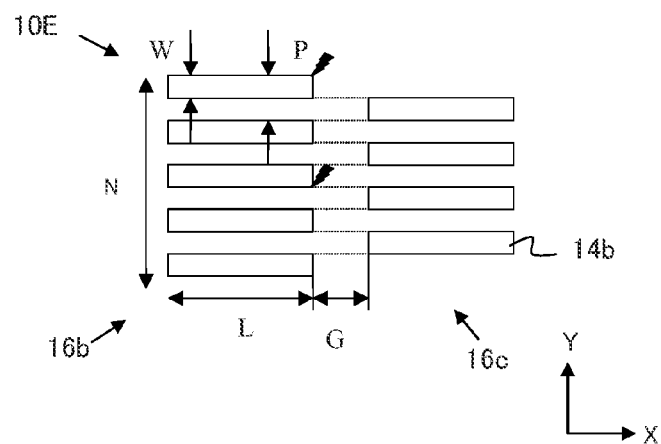

FIGS. 4A to 4C show three types of basic patterns 10C to 10E that measure the wire width.

FIG. 4A is a plane view of the basic pattern 10C having a pair of L&S patterns 16 that extends in the X direction and are spaced from each other by a gap G. Each line pattern 14 in each L&S pattern 16 has a length L ($>2 \cdot (\lambda/NA)=454$ nm) and a width W. Each L&S pattern 16 defines a pitch P and the number N. Each pattern 10C has fixed L, W, P and N and a variable G. The basic pattern 10C sets parameters W, P and N to the pair.

FIG. 4B is a plane view of a basic pattern 10D into which a line pattern 18 that extends in the Y direction is inserted between a pair of L&S pattern 16a. Each line pattern 14a of each L&S pattern 16a has a length L1 ($>2 \cdot (\lambda/NA)=454$ nm) and a width W1. Each L&S pattern 16a defines a pitch P and the number N. The line pattern 18 has a length L2 (=(P·N)+1000 nm) and a width W2, and projects from a pair of L&S pattern 16a in the longitudinal direction by 500 nm to $2 \cdot (\lambda/NA)$. A distance is G between the pattern 16a and the pattern 18. The basic pattern 10D has fixed L1, L2, W1, W2 and P, and a variable G. The basic pattern 10D sets parameters of L1, W1, W2, P and N for this combination.

FIG. 4C is a plane view of the basic pattern 10E that includes a pair of L&S patterns 16b and 16c that are spaced from each other by a gap G and extend in the X direction. The patterns 16b and 16c have the same pitch as the line pattern 14b, but the pattern 16b includes more line patterns. More specifically, the pattern 16c is arranged in place corresponding to spaces in the pattern 16b. Each line pattern has a length L1 ($>2 \cdot (\lambda/NA)=454$ nm) and a width W1, and the number of patterns 16b is N. The basic pattern 10E has fixed L, W, P and N, and a variable G. The basic pattern 10E sets parameters of W, P and N for the pair.

The risky pattern designates a pattern and a size used for the optimization. The risky pattern is set based on the past examples after it is confirmed that the device to be optimized actually has the risky pattern. The dangerous pattern is likely to makes special the exposure condition and the reticle pattern. FIGS. 5A-7B show a risky pattern group, which is usable for the model base OPC extract pattern.

Figure 5A:
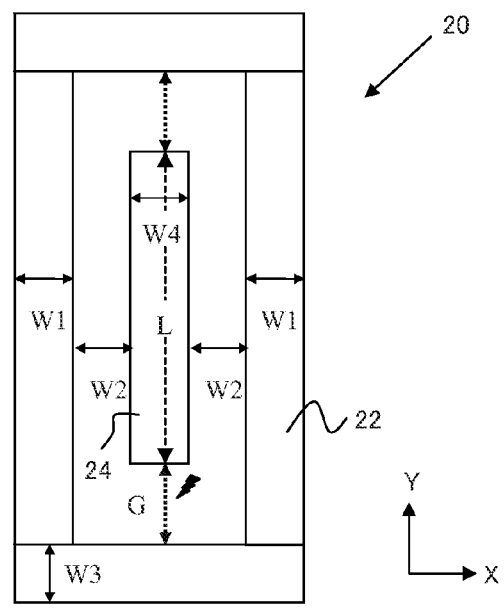
FIGS. 5A and 5B are plane views of a risky pattern group using one embodiment of the present invention.
Figure 5B:
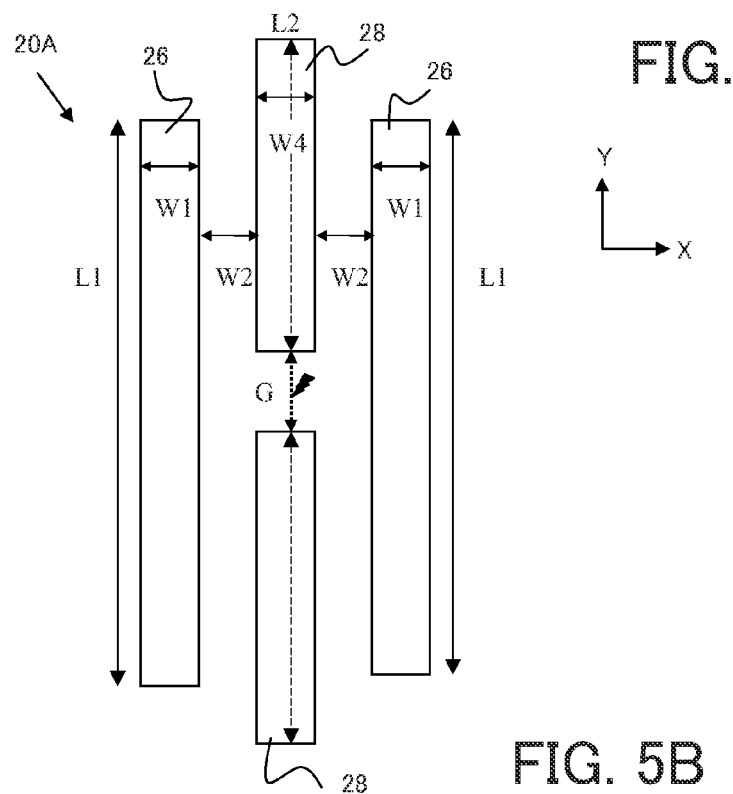

FIGS. 5A and 5B shows two types of risky patterns 20 and 20A used to measure a special line end.

The risky pattern 20 shown in FIG. 5A includes a line pattern 24 that has a length of L and a width W4 and extends in the Y direction in hollow rectangular XY patterns 22. The Y pattern 22 has a width W1 in the X direction, and the X pattern 22 has a width W3 in the Y direction. The patterns 22 and 24 are spaced from each other by a distance W2 in the X direction and a distance G in the Y direction. The risky pattern 20 has fixed L, W1-W4, and a variable G. The risky pattern 20 sets parameters W1 to W4 to this shape.

The risky pattern 20A shown in FIG. 5B includes a pair of line patterns 26 that extend in the Y direction and have a length L1 and a width W1, and a pair of line patterns 28 that extend in the Y direction, have a length L2 and a width W4, and are spaced from each other by a distance G in the Y direction. The line patterns 26 and 28 are apart from each other by a distance W2. The risky pattern 20A has fixed L1, L2, W1 and W2, and a variable G. The risky pattern 20A sets parameters L1, L2, W1 and W4 to this shape.

Figure 6A:
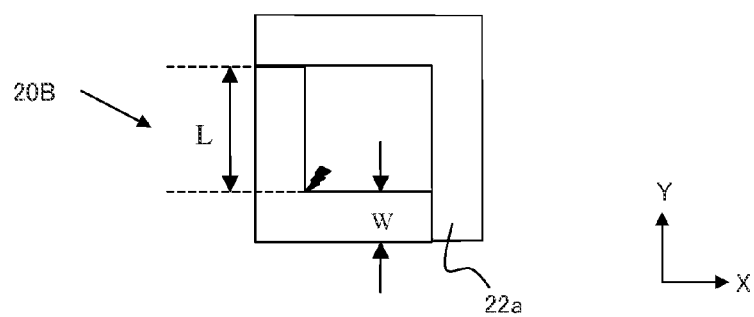
FIGS. 6A and 6B are plane views of a risky pattern group using one embodiment of the present invention.

FIG. 6A is a plane view of the risky pattern 20B used to measure a corner. The risky pattern 20B includes a hollow rectangular pattern 22a, which defines a hollow square with each side having a length L and a width W in the XY directions. $0.3 \cdot (\lambda/NA) < W < 1 \cdot (\lambda/NA)$ or 68 nm$<W<$227 nm is met, and W$<$L$<$10W is also met. The risky pattern 20B is represented by an isolated pattern due to the special figure of the corner, and has an object of rounding.

Figure 6B:
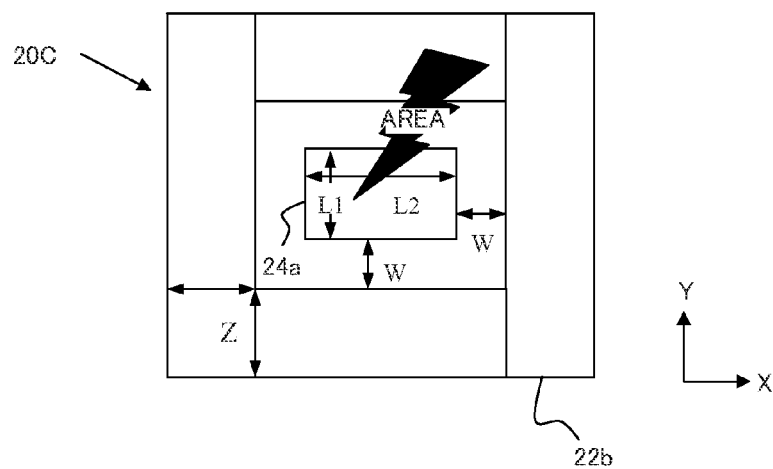

FIG. 6B is a plane view of the risky pattern 20C as an islet pattern. The risky pattern 20B includes a hollow rectangular pattern 22b and a rectangular pattern 24a formed in the hollow. The pattern 22b has a width Z in both the XY directions. The patterns 22b and 24a are spaced from each other by W both in both the XY directions. The pattern 24a has a length L1 in the Y direction and L2 in the X direction. $0.3 \cdot (\lambda/NA) < W < 1 \cdot (\lambda/NA)$ or 68 nm$<W<$227 nm is met, and L1$<$L2 is also met. W is a parameter. $Z > 2 \cdot (\lambda/NA)=454$ nm is met.

Turning back to FIGS. 7A-C, a target value of the optimization is then set for each pattern (step 1006). By way of example, the target value includes a size difference between design data of the device's functional unit pattern and the post-optimization calculational transfer result, and various types of lithography margins, such as an exposure margin and a focus margin. In addition, the target value includes a size difference between design data of a representative pattern and the post-optimization calculational transfer result, and various types of lithography margins, such as an exposure margin and a focus margin. The target value is changed for each pattern in accordance with the importance of the pattern.

Next follows the optimization to both the device functional unit pattern and the representative pattern (step 1008). The optimization basically uses an optical-image calculation result. The lithography calculation assumes no aberrations. The OPC relies upon the optical image. The exposure apparatus sets parameters of a numerical aperture ("NA") of a lens, a wavelength, an aberration, and a two-dimensional shape, a light intensity distribution, and a polarization state of the illumination light. The wavelength includes a laser dispersion (E95), and a double wavelength exposure system having slightly different wavelengths. The double wavelength exposure system allows a laser to generate the lights having wavelengths that are different by several pm. When the wavelength differs, an imaging point of the reticle pattern on the wafer differs by the depth of focus ("DOF") of the pattern due to the chromatic aberration of the projection optical system. The optical image is a superposition between two optical images having different imaging points. The two imaging points reduce a fluctuation of the optical image to the defocus, and the DOF extends apparently. The problem is that the optical image is inferior to that uses a single wavelength even on the best focus.

The resist is exposed with the optical image determined by the above parameters. However, the optical image calculated with a uniform value or threshold causes a discordance with a transferred resist image, for example, because resist's top and bottom are different in defocus, the post-exposure baking ("PEB") promotes acid dispersion, and the resist's solubility differs due to the exposure dose (acid generation amount) distribution upon the resist. The conformity improves between the calculated value and the experimental value by varying the threshold in accordance with an inclination at a pattern edge of the optical image, etc.

Step 1008 in this embodiment initially optimizes the NA, wavelength, and illumination condition, and then optimizes the aberration.

The optimization of the NA begins with the maximum NA value of the exposure apparatus. A higher NA is suitable for the pattern transfer but not for the DOF. Since the wavelength distribution (E95) and the double wavelength exposure system deteriorate the image quality (e.g., contrast), the initial value is a minimum value of the wavelength distribution (E95) or non-use of the double wavelength exposure system, except for the following special optimization.

The two methods below are used to optimize the illumination. The optimization in the first method relies upon a typical effective light source shape. The effective light source shape includes a circle, annuli FIGS. 8A to 8C, dipole FIGS. 8D and 8E, quadrupole FIGS. 8F and 8G, multipole, etc. These are effective to many device patterns. Therefore, the effective light source shapes are set as standard equipment in the exposure apparatus.

This method can acquire an arbitrary effective light source shape using a diffraction grating. This method is referred to as an Advanced Flexible Illumination System ("AFIS"). The AFIS provides a change of a similar shape using a zooming function of an illumination optical system. The light intensity is not uniform but has a distribution in an opening. The distribution may differ among exposure apparatuses, but this embodiment utilizes an average distribution that is available in a design. The opening shape and its light intensity distribution lead to a three-dimensional expression of the illumination intensity distribution, and it is converted into a function, not a bitmap. The function sets several types of parameters as indexes of the optimization.

A polarization, which will be described later, is one physical quantity in the illumination in addition to the light intensity. The polarization is classified into a polarized light having an electric field of the exposure light parallel to a plane formed by the light exited from a lens and the refracted incident light/reflected light upon the resist, and a polarized light having the electric field perpendicular to the plane. The former is referred to as a TM polarized light, an X polarized light, or a radially polarized light. The latter is referred to as a TE polarized light, a Y polarized light, or a tangentially polarized light. Since the latter provides a higher contrast of the optical image, the optimization uses the latter. More specifically, for the circular illumination having a center opening, the Y polarized light for one type of pattern direction is set to the polarization as shown in FIG. 8A. With no center opening, the tangentially polarized light is set as shown in FIGS. 8C and 8G. The limited polarization may cause a pattern deformation, and the non-polarized light that uniformly mixes both polarized lights is also one mode of the optimization.

Thus, the illumination state can be expressed by a combination of the three-dimensional shape and three types of polarization states expressed by the parameters in the AFIS function. The three polarization states include a Y polarized light for a circular illumination having a center opening, a tangentially polarized light in an illumination that has no center opening, and a non-polarized light. A designated lithography margin and the like are calculated in this state, and the illumination is optimized. Since there are plural target patterns, a solution must satisfy a target value for each pattern.

This method searches for the solution in a settable range of the actual exposure apparatus. Thereby, the solution can be immediately executed after calculated, and the limited number of parameters that determine the illumination characteristic can shorten the calculation time period of the solution. Since it is within the standard equipment of the exposure apparatus, the light intensity and its uniformity can be maximized.

The second method fractionates the circular illumination area, and calculates the designated pattern size difference and the lithography margin for each fractionated portion, as shown in FIG. 8H. An incoherent illumination at each location is premised in forming an image on the wafer. The radially polarized light and tangentially polarized light are considered in the polarization at each location. As shown in FIGS. 9A to 9D, the pattern size difference and lithography margin designated by two polarized lights are calculated at each location in the illumination. Here, FIGS. 9A to 9D are plane views of some patterns and corresponding evaluation points indicated by segments. The evaluation items include the DOF, EL, contrast, mask error factor ("MEF") etc. The entire illumination area is evaluated, and a map that correlates a location and a polarized light is created. Then, the illumination is optimized by selecting a polarized light that meets the designated lithography margin value. The result may contain a very special polarized light, but this method aims to calculate an ideal calculation value, and determines the actually used effective light source shape by taking various real statuses into account.

Turning back to FIGS. 7A-C, it is determined whether the functional unit pattern in the device to be optimized and representative pattern have a common solution that satisfies the target value set in step 1006 (step 1010). With no solution, whether or not the optimization has been repeated plural times (step 1012).

When the optimization has not been conducted plural times, a new optimization follows by reselecting the representative pattern or by changing a target value, such as conformity with a pattern design data, and a lithography margin (step 1014). In reselection, the procedure returns to step 1002. In target-value change, the procedure returns to step 1006.

When the target value is changed (steps 1014, 1006), the optimization repeated by lowering the NA or by using the double wavelength exposure system. When the exposure margin has not yet been finalized, the above measure would deteriorate it. Thus, instead of this measure, the optimization is stopped with an error flag. E95 is a delicate adjustment and effective to pattern matching without significantly changing the lithography margin. With no solution even after these adjustment and optimization are conducted plural times, the optimization is stopped with an error flag (step 1020).

On the other hand, when the optimization has been conducted plural times (step 1012) with no solution (step 1010), the procedure moves to step 1016. Step 1016 determines whether a memory cell and a basic pattern group have their own different solutions although they have no common solution when the target designated pattern is the memory cell. When they have their own different solutions, the method proposes a user to separately expose the memory cell and the peripheral circuit, and separately repeats an optimization from the beginning for each of them (step 1018). This is the special step, and thus is made optional. If there is no single solution, the optimization is stopped with an error flag (step 1020).

When they have their own different solutions (step 1010), it is unusual that only a single value exists to all the parameters of the solution and each parameter has a width of solution. For this reason, the host proposes plural solutions to the two illumination optimization methods (step 1022).

Then, by using the known database, an available illumination is flagged in the AFIS in existing exposure apparatus (step 1024). Next, whether a new AFIS is to be created is determined (step 1026). When it is determined that the new AFIS is to be created (step 1026), the new AFIS is created (step 1028). When it is determined that no new AFIS is to be produced (step 1026), while the existing AFIS is used (step 1029), the actual illumination condition, such as a shape and a light intensity distribution, is measured in the exposure apparatus and it is determined whether it is taken as a bitmap for use (step 1030). The solution's precision in an exposure apparatus improves when an actual state of the exposure apparatus is introduced to the system. When it is determined that the bitmap is to be used (step 1030), data is obtained (step 1032). In case of NOs in both steps 1028 and 1030, it is determined whether the aberrational optimization after step 1032 emphasizes the distortion or a combination of the size difference from the design data and the lithography margin (step 1034).

The aberration can be corrected by driving or deforming some lenses in the projection optical system, or by driving a mirror in a catadioptric optical system. The aberration's influence on the patterning is classified into two, i.e., "fidelity of patterning, lithography margin" and "distortion," or in other words, resolution and overlay accuracy. These influences are preferably divided because they are different in item of the aberrational correction. The former depends upon all the terms in the Zernike-developed aberration, whereas the latter depends upon only the first and second terms.

When the "distortion adjustment" is selected (step 1034), the aberration and scanning are adjusted closest to the target distortion data (including an ideal grating) (step 1036). A solution that is closest to the target distortion is selected among plural optimal solutions optimized with the NA, illumination and wavelength (step 1038).

When the "fidelity of patterning with the target pattern and security of the lithography margin" are selected (step 1034), the procedure moves to step 1040. Step 1040 calculates the target fidelity of patterning and lithography margin for each of plural solutions optimized with the NA, illumination and the wavelength, by using the current aberrational data of the exposure apparatus and several types of aberrations corrected by the aberration correcting function of the exposure apparatus, and selects the best solution (step 1042).

This method uniquely calculates the best solution in the combination of the "plural best solutions with the NA, illumination and wavelength," and "plural aberration settings" instead of repetitive operations (step 1044). In balancing them, "the optimization engine for both the device's functional unit pattern and the basic pattern" used for the optimization of the illumination, NA and the wavelength can be utilized. The solutions of the optimal illumination and the aberration can be obtained by setting to a variable the aberration in the aberrational correction function range after the target values of "fidelity of patterning and lithography margin" and "distortion" are input. Since a resultant difference is small in the exposure apparatus that uses this technology has few aberrations, the optimization is generally ineffective from the viewpoint of the processing time period, and it is effective to select one of both factors, as described above.

Finally, the calculation result of several items is obtained as an option, and supplements understanding of the whole transfer status in the optimal exposure condition (step 1046). The first item includes a size and a lithography margin for a one-dimensional pattern with a fixed line width and a variable pitch, a two-dimensional pattern, such as various line ends, and an arbitrary combination L&S pattern. The second item includes a process window, such as the above pattern, a device functional unit pattern used for the exposure optimization, and a representative pattern.

Second Embodiment

Figure 10:
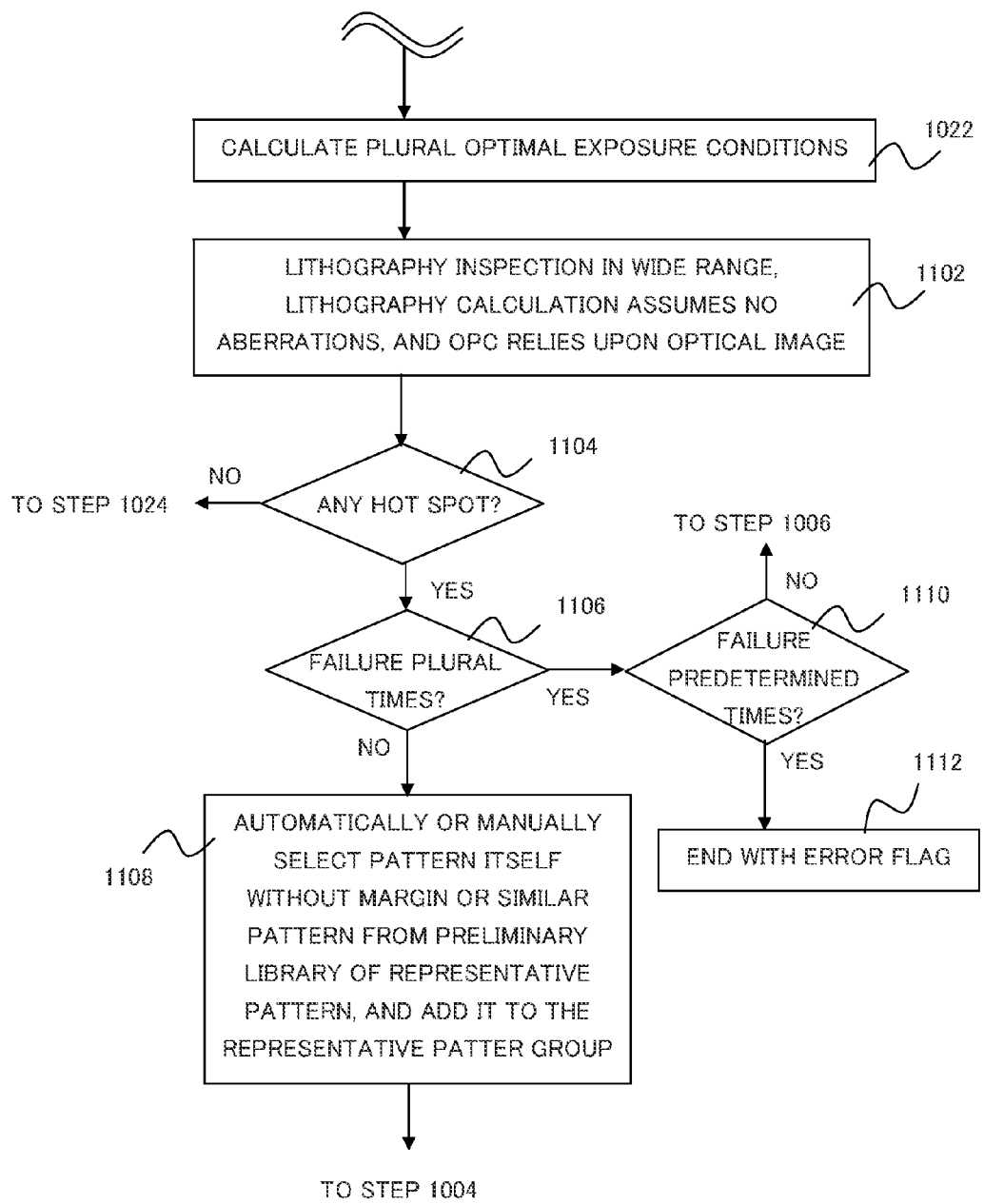
FIG. 10 is a flowchart for explaining an optimization algorithm according to a second embodiment of the present invention.

The representative pattern in the first embodiment is such a representative illustration that it is likely to cause a resolving failure because the peripheral circuit pattern contains a very special pattern. Referring now to FIG. 10, a description will be given of an approach to avoid this problem. Here, FIG. 10 is a flowchart of the optimization algorism according to a second embodiment of the present invention.

The procedure to step 1022 is similar to that in the first embodiment. An operation called a lithography verification follows step 1022 for the entire chip or partial important region (step 1102). The lithography verification initially provides an OPC process corresponding to the exposure condition to be used, and a high-speed optical calculation is conducted for the pattern. Next, a size difference between the resist's two-dimensional shape and the design value, the exposure margin, and the focus margin etc. are calculated and an error flag is raised at a location that does not maintain a predetermined margin, which may be called a hot spot.

It is determined whether there is a hot spot (step 1104). With no hot spot (step 1104), the procedure moves to step 1024 shown in FIGS. 8A-C. On the other hand, if there is a hot spot (step 1104), it is determined whether the number of failures reaches the predetermined times (step 1106). In the first failure (step 1106), the pattern itself, or a basic pattern similar to the pattern, and a risky pattern are automatically or manually selected and added to the basic pattern group (step 1108). Occasionally, an improper pattern is deleted from the basic pattern group. Then, the procedure returns to step 1004 for another optimization. The process that reduces or eliminates the hot spot continues so far as time permits to eliminate the hot spot or reduce the hot spots as few as possible. The second failure (step 1106) determines whether the number of failures reaches the predetermined times (step 1110). When the number of failures is below the predetermined number, the procedure returns to step 1006 to change the condition. On the other hand, when the number of failures reaches the predetermined number, the procedure ends with an error flag (step 1112).

Third Embodiment

A reticle that is used for one exposure apparatus can be used for another exposure apparatus. That case expects approximately the same patterning on the wafer as ever. In general, a reticle is OPC-processed, and the specification relies upon the characteristic of the previous exposure apparatus. The exposure apparatus has its own characteristic, and the same OPC-processed reticle is unlikely to provide the same pattern on the wafer when the exposure apparatus changes.

The basic method of the optimization is similar to the first embodiment. Nevertheless, this embodiment inputs (OPC-processed) reticle pattern data of the device functional unit pattern to be optimized and a transfer result on the wafer into the system. While the first embodiment selects an arbitrary index among various optimization indexes (step 1006), this embodiment sets to the optimization index the size difference from the input transfer pattern on the wafer.

Step 1008 is different from the first embodiment in NA as to the initial value of the parameters used for the optimization of the exposure apparatus, and uses the NA of the previous exposure apparatus. A special illustration that prefers a slightly blurred pattern for better pattern conformity 1) lowers the NA, 2) uses the double wavelength exposure method, or 3) utilizes the wavelength distribution (E95).

After the optimal exposure condition is determined, the lithography margin status of the basic pattern, for example, is optionally output similar to the first embodiment (step 1046). However, this embodiment emphasizes the following points: Although the existing OPC exists in the random logic pattern in the reticle, a difference from the OPC in the optimized illumination is a concern. In order to recognize this difference, any available transfer result and the design data are previously input for the model base OPC extract pattern, and display a difference between the calculation result from the design data and the experimental result.

With no transfer result, a size difference of the model base OPC extract pattern is calculated and recognized between the exposure condition of the existing exposure apparatus and the optimized exposure condition of the new exposure apparatus. Thereby, the random logic part transfer status can roughly be recognized under the new exposure condition. The model base OPC extract pattern is installed in the system. Preferably, plural reticles are prepared with patterns that are different for each pattern, and these patterns are experimentally transferred in the existing exposure apparatus and then input in the system. A calculation result is calculated for the experimentally transferred pattern and both are compared.

Fourth Embodiment

Nodes etc. of the target device provide the parameters that define a shape of the representative pattern, and this embodiment will discuss a setting of parameters more suitable for the target device and an automatic setting. An EDA tool, which is referred to as a Design Rule Checker ("DRC"), is a tool of verifying the L&S, pitch, area etc. for the full chip design data. When these verification results are statistically processed, the existence frequency in the chip, such as a pitch, can be calculated. The parameters more suitable for the target device can be set by acquiring information on the minimum value and the most frequently used value etc., and by selecting a pattern suitable for the information. When shapes of the basic and risky patterns are incorporated into the DRC rule, the shape defining parameter can be automatically set based on the frequency result.

The above case premises that the design data exists. When the design data does not exit and only the reticle is available, the design value is inferred. The inference is made, for example, by projecting the reticle onto a wafer stage under the proper exposure condition, by measuring optical images at representative locations on the reticle by using an image sensor on the wafer stage, by converting the two-dimensional pattern at a certain slice level into a rectangle, and by providing the DRC process.

This application claims a foreign priority benefit based on Japanese Patent Application No. 2005-207527, filed on Jul. 15, 2005, which is hereby incorporated by reference herein in its entirety as if fully set forth herein.

What is claimed is:

1. An exposure method for exposing a pattern of a reticle to a plate by using light from a light source and an optical system, said method comprising the steps of:
   obtaining information relating to a first pattern that represents a functional cell pattern in a circuit pattern to be exposed to the plate and a second pattern selected from a pattern group and substituted for a peripheral circuit pattern different from the functional cell pattern in the circuit pattern, the pattern group being formed separately from the peripheral circuit pattern and being preliminarily installed;
   determining at least one exposure parameter of the light source and the optical system associated with exposing both the functional cell pattern and the peripheral circuit pattern with a same exposing condition by using information of the first pattern and the second pattern obtained by the obtaining step; and
   exposing the pattern of the reticle using the exposure parameter determined by said determining step, the pattern including the functional cell pattern and the peripheral circuit pattern.

2. The exposure method according to claim 1, wherein the second pattern includes a basic pattern fundamental to the peripheral circuit pattern, and a risky pattern that is less likely to resolve in the second pattern than the basic pattern.

3. The exposure method according to claim 2, wherein the second pattern includes plural types of basic patterns, plural types of risky patterns, or both plural types of basic patterns and plural types of risky patterns.

4. The exposure method according to claim 1, further comprising the steps of:
   selecting an entire or specific region in the circuit pattern;
   evaluating a resolution of the region selected by said selecting step by using the exposure parameter which has been tentatively determined by said determining step; and
   determining a new exposure parameter by changing the second pattern based on an evaluation result by the evaluating step and by using information of the first pattern and the changed second pattern.

5. The exposure method according to claim 1, wherein said determining step determines the pattern of the reticle by calculating optical images of the first pattern and the second pattern by using the information of the first pattern and the second pattern obtained by the obtaining step.

6. The exposure method according to claim 5, wherein said method is used for a first exposure apparatus that includes the optical system, wherein said obtaining step further obtains an actual exposure result of the reticle in a second exposure apparatus when the pattern of the reticle is partially modified to resolve the pattern of the reticle in the second exposure apparatus different from the first exposure apparatus.

7. The exposure method according to claim 6, further comprising the steps of:
   simulating, based on an exposure parameter set in said determining step, an exposure result if the first exposure apparatus exposes the reticle; and
   obtaining, based on the actual exposure result and the simulation result, resolving power information to different patterns of the reticle by the first and second exposure apparatuses.

8. The exposure method according to claim 1, further comprising the steps of:
   measuring the peripheral circuit pattern using a design rule checker; and
   generating the second pattern based on a measurement result of said measuring step.

9. The exposure method according to claim 8, further comprising the step of inferring the pattern of the reticle based on an actual exposure result of the reticle, said measuring step being performed for the pattern of the reticle that has been inferred by said interring step.

10. A non-transitory computer readable medium storing a program that when executed by a computer, causes the computer to execute the exposure method according to claim 1.

11. The exposure method according to claim 1, wherein said determining step determines the exposure parameter in a controllable range of the light source and the optical system.

12. The exposure method according to claim 1, wherein each pattern of the pattern group is different from the peripheral circuit pattern.

13. An exposure method for exposing a pattern of a reticle to a plate by using light from a light source and an optical system, said method comprising the steps of:
   obtaining information relating to a first pattern that represents a functional cell pattern in a circuit pattern to be exposed to the plate and a second pattern selected from a pattern group and substituted for a peripheral circuit pattern different from the functional cell pattern in the circuit pattern, the pattern group being formed separately from the peripheral circuit pattern and being preliminarily installed;
   determining a size, a shape, or both a size and a shape of the pattern of the reticle and at least one exposure parameter of the light source and the optical system associated with exposing both the functional cell pattern and the peripheral circuit pattern with a same exposing condition by using information of the first pattern and the second pattern obtained by the obtaining step; and
   exposing the pattern of the reticle using the exposure parameter determined by said determining step, the reticle including the functional cell pattern and the peripheral circuit pattern.

14. A non-transitory computer readable medium storing a program that when executed by a computer, causes the computer to execute a method for determining an exposure parameter used to expose a pattern of a reticle to a plate by using light from a light source and an optical system, said method comprising the steps of:
   obtaining information relating to a first pattern that represents a functional cell pattern in a circuit pattern to be exposed to the plate and a second pattern selected from a pattern group and substituted for a peripheral circuit pattern different from the functional cell pattern in the circuit pattern, the pattern group being formed separately from the peripheral circuit pattern and being preliminarily installed; and
   determining at least one exposure parameter of the light source and the optical system associated with exposing both the functional cell pattern and the peripheral circuit pattern with a same exposing condition by using information of the first pattern and the second pattern obtained by the obtaining step.

15. A non-transitory computer readable medium storing a program that when executed by a computer, causes the computer to execute a method for determining an exposure parameter used to expose a pattern of a reticle to a plate by using light from a light source and an optical system, said method comprising the steps of:
   obtaining information relating to a first pattern that represents a functional cell pattern in a circuit pattern to be exposed to the plate and a second pattern selected from a pattern group and substituted for a peripheral circuit pattern different from the functional cell pattern in the circuit pattern, the pattern group being formed separately from the peripheral circuit pattern and being preliminarily installed; and
   determining a size, a shape, or both a size and a shape of the pattern of the reticle and at least one exposure parameter of the light source and the optical system associated with exposing both the functional cell pattern and the peripheral circuit pattern with a same exposing condition by using information of the first pattern and the second pattern obtained by the obtaining step.

* * * * *